L. G. SIMPSON.
PARING MACHINE.
APPLICATION FILED JAN. 29, 1906.
899,340.
Patented Sept. 22, 1908.
FIGURE 1.
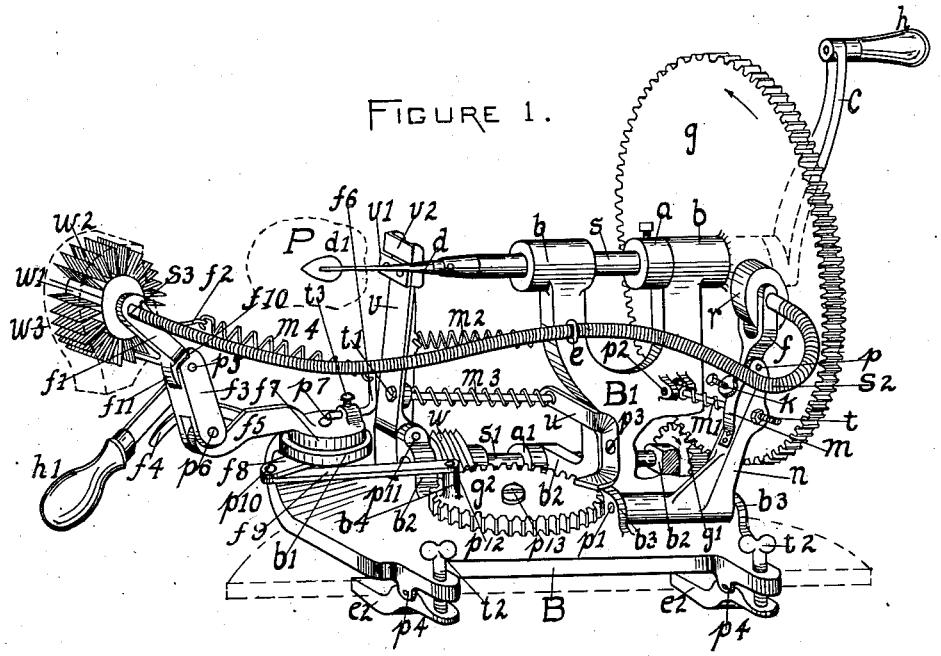
Fig. 2.
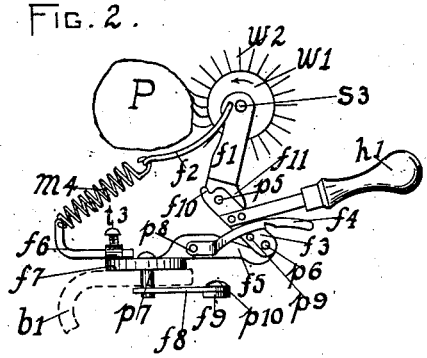
Fig. 3.
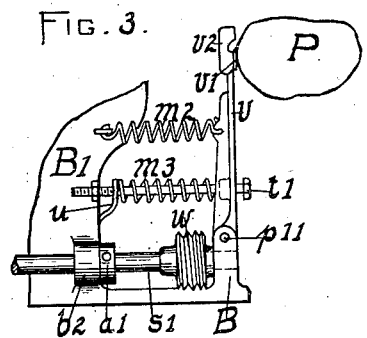
Fig. 4.
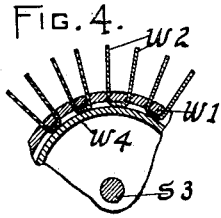
Fig. 7.
Fig. 5.  Fig. 6.
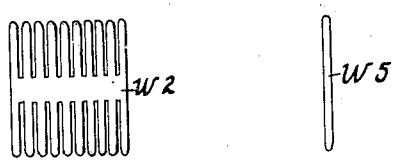
WITNESSES:
Lottie Wood.
Wm. G. Staudenmaier.
INVENTOR:
Leon G. Simpson
by W. H. Cooley
Atty.
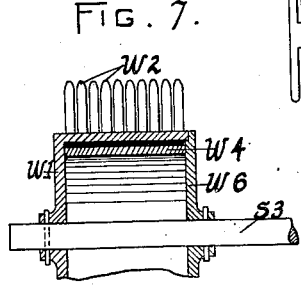

UNITED STATES PATENT OFFICE.

LEON G. SIMPSON, OF ROCHESTER, NEW YORK.

PARING-MACHINE.

No. 899,340.  Specification of Letters Patent.  Patented Sept. 22, 1908.

Application filed January 29, 1906. Serial No. 298,349.

*To all whom it may concern:*

Be it known that I, LEON G. SIMPSON, a citizen of the United States, residing at Rochester, in the county of Monroe and State of New York, have invented a new and Improved Paring-Machine, of which the following is a specification.

This invention relates to machines for paring or peeling, vegetables or fruit having a skin of a character readily removable by abrasion, and has for its object to provide an efficient mechanism adapted to peel such articles of varying sizes and conformations, and also adapted to remove the skin from the same, at least to a very large extent, in cavities or irregularities in the surface thereof.

My invention consists in providing a support for the vegetable, and a brush having a surface adapted to remove the skin therefrom, and providing means for exposing practically the entire surface of the vegetable to the action of such brush, while, at the same time, maintaining a relative motion between the surface of the vegetable, at successive points therein, and the brush.

An embodiment of my invention comprises a revoluble support for carrying the vegetable and a revoluble brush for removing the skin therefrom, and I have found it desirable to provide a brush of cylindrical form, and to impart thereto a measurably rapid rate of rotation while it is in contact with the surface of the vegetable; and in such an arrangement I provide, also, means for exposing practically the entire surface of the vegetable to the action of the brush I have, however, found it desirable to remove a small portion of the skin from the vegetable, being that portion next to the impaling pin upon which the vegetable is carried and revolved, by means of a knife adjusted to operate only at this point during a brief period.

In the accompanying drawings I have shown my invention embodied in a paring machine, adapted more especially to paring potatoes and in which the potato is supported upon and revolved with an impaling pin, or arm, and exposed on its surface to the action of a rapidly revolving cylindrical brush, having flexible teeth adapted to remove the skin from the potato in small fine particles.

Such drawings are as follows,—Figure 1 shows my machine in perspective. Fig. 2 shows a view of part of my machine as seen from the left hand end, showing the revoluble brush in contact with the potato, in the process of paring the same. Fig. 3 is a view of a part of my machine as seen from the rear side, and shows the knife $v^1$ and its supporting and carrying mechanism in operative position for removing the skin from the potato, next to the carrying pin $d$. Fig. 4 shows, in central vertical transverse section, a part of the revolving brush. Figs. 5 and 6 show details in the construction of the brushing teeth, as will be explained. Fig. 7 shows in central longitudinal section a part of the brush.

Similar characters refer to similar parts throughout the several figures.

Referring to the drawings,—B is the base plate of my machine, projecting upwards from which is seen the standard $B^1$ carrying at its upper bifurcated end the bearings $b$, in which there is revolubly supported the shaft $s$. This shaft $s$ has secured on the right end thereof a gear wheel $g$ and the crank $c$ having the handle $h$ thereon. Secured in the left hand of the shaft $s$ is seen the carrying pin $d$, having inserted in its left hand end the flat and pointed blade $d^1$, adapted to engage the potato on the inside and cause the same to revolve with the pin $d$, secured in the shaft $s$.

The gear $g$ engages the gear $g^1$ on shaft $s^1$ revolubly supported in bearings $b^2$ formed on the base plate B and on the standard $B^1$. On the left hand end of the shaft $s^1$ is seen the worm $w$ engaging the horizontally disposed worm gear $g^2$, revoluble upon the pin $p^{13}$ secured in the base B. The rear left hand corner of the base B is curved upwardly and terminates in the horizontal portion $b^1$, in which there is formed a bearing for the vertical shaft $p^7$, carrying on its lower end the crank $f^8$, articulating with the left hand end of the connecting link $f^9$ by means of the pin $p^{10}$, while, the right hand end of this link $f^9$ articulates upon a crank pin $p^{12}$ carried by the gear $g^2$. On the upper end of shaft $p^7$ is secured the base plate $f^7$, which is, of course, moved angularly with this shaft $p^7$. This base plate $f^7$ carries a projection, in which is threaded the screw $t^3$, and by means of which the arm $f^6$ is so adjusted as to secure any desired tension upon the spring $m^4$, the function of which will be explained later. This base plate $f^7$ also carries an arm $f^5$, with which the arm $f^3$ articulates upon the pin $p^6$. The brush fork $f^1$ is pivoted to the upper end of this arm $f^3$ and upon the pin $p^5$, and suitable stops $f^{10}$ and $f^{11}$ are provided on lever $f^3$ and fork $f^1$, respectively, to limit the angular motion of fork $f^1$ on pin $p^5$. The forward motion of lever $f^3$ is limited by the inclined upper edge of the arm $f^5$. At the upper ends of this brush carrying fork $f^1$ are formed bearings for the shaft $s^3$ upon which there is secured the cylindrical brush for removing the skin from the potato. An arm $n$ is pivotally supported upon a pin $p^1$, passing through the ears $b^3$ formed on the base plate B and the standard $B^1$. This arm $n$ extends upwardly and towards the right and carries the pin $p$ at its upper end, upon which there is pivoted the rocking lever $f$, carrying the friction roll $r$ revolubly supported in bearings in the upper end of lever $f$. A screw $k$, operating against the free end of the flat spring $m$, rigidly secured to the arm $n$,—such screw threaded through the lower end of the arm $f$ is provided that the pressure between the friction roll $r$ and the side of the gear $g$ may be adjusted as desired.

For varying the rate of rotation of the friction roll $r$ relative to that of the gear $g$, the arm $n$ is moved to or from the standard $B^1$, swinging upon the pin $p^1$ as already described, and is held in adjusted position by means of a nut on the bolt $t$, pivoted on the pin $p^2$, carried by ears formed on the standard $B^1$ and extending through a hole in the adjustable arm $n$ and operating to hold the arm $n$ against the pressure of the spring $m^1$, whereby the arm $n$ carrying the forked support for the lever $f$ may be swung so as to move the roller $r$ towards or away from the center of the gear $g$ to vary the rate of rotation of the roller $r$ relatively to that of the shaft $s$. A flexible shaft $s^2$ supported near its middle in an eye $e$, secured in the standard $B^1$, serves to communicate motion from the roller $r$ to the shaft $s^3$ carrying brush $w^1$, the rate of rotation of which is varied by the adjustment of the arm $n$ in the manner just described and indicated. A collar $a$ adjustably secured upon the shaft $s$ serves to sustain, in the manner indicated, the thrust to the right exerted upon shaft $s$ through the gear $g$ by the friction roll $r$.

Pivotally supported upon the pin $p^{11}$, extending through suitable ears formed on the base plate B, is seen the knife carrying arm $v$, having at its upper end the knife guard $v^2$ and the knife $v^1$. A bent lever $u$ is pivotally supported at $p^3$, as seen in Fig. 1, from the standard $B^1$. This lever $u$ has a hole through its upper end, through which there passes the bolt $t^1$ and around this bolt $t^1$ there is located the spring $m^3$, arranged to engage at its right and left hand ends, respectively the upper end of the lever $u$ and a boss formed on the lever $v$, in such a way as to tend to impart to this lever $v$ any motion to the right, as seen in Fig. 3, of the lever $u$. The lower end of this lever $u$ carries a longitudinal extension and is beveled to permit the boss $b^4$, when the gear $g^2$ is revolved in the direction indicated by the arrow, to engage the lever $u$ and force the lower end thereof to the right and then pass by and out of engagement therewith, once for each revolution of the gear $g^2$. By this operation of the lever $u$ and through the medium of the spring $m^3$, the lever $v$ carrying the knife $v^1$ is moved to the left as seen in Fig. 1 for each revolution of the gear $g^2$, causing the knife $v^1$ to engage the right hand side of the potato P for at least one revolution thereof, to remove the skin therefrom next to the pin $d$ at points not readily accessible to the action of the brush $w^1$. A spring $m^2$ extending between and connecting the lever $v$ and the standard $B^1$, as seen in Fig. 3, operates normally to hold the lever $v$ to the right, as seen in Fig. 1, and this lever $v$ is forced over to the left only under the action of the stronger spring $m^3$, which latter spring permits a yielding engagement of the knife $v^1$ with the potato and operates to restore the lever $u$ to the position indicated in Fig. 1. The bolt $t^1$ operates to support and properly aline at all times the spring $m^3$.

The revolving brush for removing the skin from the potato is constructed preferably in the following manner,—The teeth $w^2$ are formed in connected sections from thin sheets of spring steel and cut as indicated, either in Fig. 5 with all the teeth in two adjacent rows connected together at that portion where they are secured in a cylinder $w^1$, or two of such teeth may be formed of a single strip, as seen in Fig. 6 at $w^5$. The teeth are bent to a U shape and inserted in the slots therefor in the cylinder $w^1$, and are held in place by means of the inner cylinder $w^4$. One of the ends $w^6$ of the cylinder $w^1$ is removable, as indicated in Fig. 7, and both of the ends of this cylinder $w^1$ are secured upon the shaft $s^3$, which in turn is secured to and receives its motion from the flexible shaft $s^2$. The bars into which the shell of the cylinder $w^1$ is divided are rounded at their outer edges, as indicated in Fig. 4, to permit a greater degree of flexibility of the teeth $w^2$.

The handle $h^1$ is secured to the arm $f^3$ and a spring $m^4$, connected to the arm $f^6$, as already described, and to the yoke $f^2$, articulating with the upper end of the arm $f^1$, is provided for forcing the arm $f^1$ carrying the brush $w^1$, against the potato P in the manner indicated in Fig. 2. By means of the handle $h^1$ the arm $f^3$ and the parts carried thereby may be drawn to the position indicated in Fig. 1, in which position it may be held by means of a latch $f^4$ pivoted at $p^8$, engaging the pin $p^9$ on the arm $f^3$.

A hood or jacket $w^3$ is provided to catch the fine particles of skin as they are removed from the potato and cause them to be thrown down and away from the machine. This hood $w^3$ is shown only in dotted outline in Fig. 1.

Means are provided for securing the machine to any suitable table or support, comprising the clamping arms $e^2$, pivoted at $p^4$, to ears formed on the under side of the base B, as seen in Fig. 1, and these clamping arms $e^2$ are forced into engagement with the under side of the top of the table, so as to clamp the same between such levers $e^2$ and the base B, by means of the thumb screws $t^2$, provided for this purpose.

The operation of my machine is briefly described as follows:—First, the machine is adjusted preferably so that the parts assume the relative positions indicated in Fig. 1, for which positions latch $f^4$ engages pin $p^9$, then a potato is forced over and upon the pin $d$, then the shaft $s$ is revolved by means of the handle $h$ and the latch $f^4$ is disengaged from the pin $p^9$, causing the brush $w^1$ to engage the potato as it is revolved. By means of the flexible shaft $s^2$, the brush $w^1$ is revolved in the manner already described and indicated, and at the same time the worm $w$ is revolved with the shaft $s^1$, imparting rotary motion to the worm gear $g^2$, and this results, by means of the connection between this worm gear $g^2$ and the crank arm $f^8$ on shaft $p^7$, in causing the brush $w^1$, on account of its support and connection already described, to be moved first towards and then away from the operator and to the right practically half way around the potato, while the rapid rotation of this brush $w^1$ causes the teeth thereon to remove the skin from the potato in fine particles which are deflected downwardly by the hood $w^3$. The relation between the crank $f^8$ and the diameter of the circle described by the pin $p^{12}$ is such that, as the worm gear $g^2$ revolves, the brush $w^1$ is caused to move reciprocally from left to right and right to left.

In the foregoing specifications and in the following claims I am using the term vegetable, meaning thereby any article of vegetable growth having a skin of such a character that it may be removed by abrasion.

What I claim is:

1. In a vegetable paring machine; a main operating element; a revoluble support for the vegetable and means connected with such main operating element for rotating such vegetable support; a brush revolubly supported in a frame and flexibly connected to a carrier; means connecting the brush and the carrier for yieldably holding such brush against the vegetable; such carrier being pivotally supported on the machine, and connections between such main operating element and such brush for rotating the same therefrom and between such main operating element and such carrier for causing the same to traverse successively a cycle in which such brush traverses a path approximately half way around the vegetable.

2. In a vegetable paring machine; a main operating element; a revoluble support for the vegetable and means connected with such main operating element for rotating such vegetable support; a revoluble brush; a yieldable and elastic support for such brush; means, connected with such main operating element, for revolving such brush; means also connected with such main operating element for causing the brush to traverse successively a cycle including a path approximately half way around and in contact with a vegetable on such support therefor; a knife flexibly mounted upon the machine and means suitably mounted on the machine for bringing such knife into engagement with such vegetable at points adjacent to such support therefor at regular intervals bearing a definite relation to the periods of time during which such brush traverses such cycle.

3. In a vegetable paring machine; a main operating element; a revoluble support for the vegetable and means connected with such main operating element for rotating such vegetable support; a revoluble brush; a frame carrying bearings for such brush; means suitably mounted on the machine and actuated by the main operating element for supporting and operating such frame whereby such brush is caused to traverse successively a cycle including a path approximately half way around and in elastic and yieldable contact with a vegetable on such support therefor and means for imparting rotary motion to such brush from such main operating element.

4. In a vegetable paring machine; a main operating element; a revoluble support for the vegetable and means connected with such main operating element for rotating such vegetable support; a revoluble brush; a frame carrying bearings for such brush; means suitably mounted on the machine and actuated by the main operating element for supporting and operating such frame whereby such brush is caused to traverse successively a cycle including a path approximately half way around and in elastic and yieldable contact with a vegetable on such support therefor and approximately in a horizontal plane passing through the axis of such revoluble support for the vegetable and means for imparting rotary motion to such brush from such main operating element.

5. In a vegetable paring machine; a main operating element; a revoluble support for the vegetable and means connected with such main operating element for rotating such vegetable support; a shaft revolubly supported in a frame, such frame flexibly connected with a carrier and such carrier mounted to swing on the machine; connections between such main operating element and such shaft for rotating the same therefrom; a brush operatively supported from such shaft; connections between such carrier and such main operating element for causing such carrier to traverse successively a cycle in which such brush traverses a path approximately half way around the vegetable and means for yieldably holding such brush against the vegetable.

6. In a vegetable paring machine; a main operating element; a revoluble support for the vegetable and means connected with such main operating element for rotating such vegetable support; a brush operably mounted in a frame and flexibly connected with a carrier, such carrier pivotally mounted on the machine; connections between such main operating element and such brush for operating the same to cause different successive points thereof to contact with the vegetable; connections between such carrier and such main operating element for causing such carrier to traverse successively a cycle in which such brush traverses a path approximately half way around the vegetable and means for holding such brush against the vegetable.

LEON G. SIMPSON.

Witnesses:
RALPH R. SIMPSON,
ALBERT C. BELL.